United States Patent
Chen et al.

(10) Patent No.: US 8,437,399 B2
(45) Date of Patent: May 7, 2013

(54) METHOD AND ASSOCIATED APPARATUS FOR DETERMINING MOTION VECTORS

(75) Inventors: Chung-Yi Chen, Hsinchu Hsien (TW); Su Chun Wang, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 874 days.

(21) Appl. No.: 12/366,684

(22) Filed: Feb. 6, 2009

(65) Prior Publication Data

US 2009/0316044 A1 Dec. 24, 2009

(30) Foreign Application Priority Data

Jun. 20, 2008 (TW) .............................. 97123110 A (51) Int. Cl.
*H04N 7/12* (2006.01)

(52) U.S. Cl.
USPC .................................................. 375/240.16

(58) Field of Classification Search .............. 375/240.16
See application file for complete search history.

(56) References Cited

U.S. PATENT DOCUMENTS

2005/0286635 A1* 12/2005 Kumar et al. ............ 375/240.16
2008/0130752 A1* 6/2008 Hamakawa et al. ..... 375/240.16

* cited by examiner

*Primary Examiner* — Richard Torrente
(74) *Attorney, Agent, or Firm* — Edell, Shapiro & Finnan, LLC (57) ABSTRACT

A method and an associated apparatus for determining a motion vector are disclosed. The method includes performing block matching for a first block where an interpolated block is located according to the first frame and the second frame to generate a first candidate motion vector of the interpolated block, performing block matching for a second block where the interpolated block is located according to the first frame and the second frame to generate a second candidate motion vector of the interpolated block, and determining a target motion vector of the interpolated block according to either of the first motion vector and the second candidate motion vector.

9 Claims, 9 Drawing Sheets

METHOD AND ASSOCIATED APPARATUS FOR DETERMINING MOTION VECTORS

CROSS REFERENCE TO RELATED PATENT APPLICATION

This patent application is based on Taiwan, R.O.C. patent application No. 09723110 filed on Jun. 20, 2008.

FIELD OF THE INVENTION

The present invention relates to an image processing mechanism, and more particularly, to a method and an associated apparatus for determining a motion vector by block matching using different block sizes.

BACKGROUND OF THE INVENTION

Currently, in the realm of motion estimation and motion compensation technology, block matching is commonly adopted for determining a motion vector. For the block matching mechanism, a single block size is used for block matching, while the block size has a crucial effect on the motion vector determined. In general, when using a small block size for block matching, multiple similar image blocks are likely found such that choosing a correct motion vector is difficult. Usually, the motion vector determined does not truly reflect an actual motion direction of an image object. In contrast, when using a large block size for block matching, it is more difficult to find a similar image block. If a motion vector is determined using a large block, image quality from interpolation using the motion vector may be unsatisfactory. Therefore, the prior block matching mechanism is faced with a dilemma when determining a motion vector whether with a single large block or a single small block.

SUMMARY OF THE INVENTION

Therefore, it is one of the objectives of the invention to provide a method and an associated apparatus for determining a target motion vector according to block matching on blocks of different sizes.

According to one embodiment of the invention, a method is provided for determining a motion vector of one interpolated block in an interpolated frame, wherein the interpolated frame is generated according to a first frame and a second frame, in succession, and the interpolated frame is partitioned into a plurality of first blocks in a first block size and a plurality of second blocks in a second block size, the method comprising performing block matching for a first block where an interpolated block is located according to the first frame and the second frame to generate a first candidate motion vector of the interpolated block; performing block matching for a second block where the interpolated block is located according to the first frame and the second frame to generate a second candidate motion vector of the interpolated block; and determining a target motion vector of the interpolated block according to either of the first motion vector and the second candidate motion vector.

According to another embodiment of the invention, an apparatus is provided for determining a motion vector of one interpolated block in an interpolated frame, wherein the interpolated frame is generated according to a first frame and a second frame, in succession, and the interpolated frame is partitioned into a plurality of first blocks in a first block size and a plurality of second blocks in a second block size, the apparatus comprising: a first generating circuit, for performing block matching for a first block where an interpolated block is located according to the first frame and the second frame to generate a first candidate motion vector of the interpolated block; a second generating circuit, for performing block matching for a second block where the interpolated block is located according to the first frame and the second frame to generate a second candidate motion vector of the interpolated block; and a determining circuit, coupled to the first generating circuit and the second generating circuit, for determining a target motion vector of the interpolated block according to either of the first motion vector and the second candidate motion vector.

According to another embodiment of the invention, an apparatus is provided for determining a motion vector of one interpolated block in an interpolated frame, wherein the interpolated frame is generated according to a first frame and a second frame, in succession, and the interpolated frame is partitioned into a plurality of first blocks in a first block size and a plurality of second blocks in a second block size, the apparatus comprising: a motion vector generating circuit, for performing block matching for a second block where the interpolated block is located according to the first frame and the second frame to generate a second candidate motion vector of the interpolated block and performing block matching for a second block where the interpolated block is located according to the first frame and the second frame to generate a second candidate motion vector of the interpolated block; and a determining circuit, coupled to the motion vector generating circuit, for determining a target motion vector of the interpolated block according to either of the first motion vector and the second candidate motion vector.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

Figure 1:
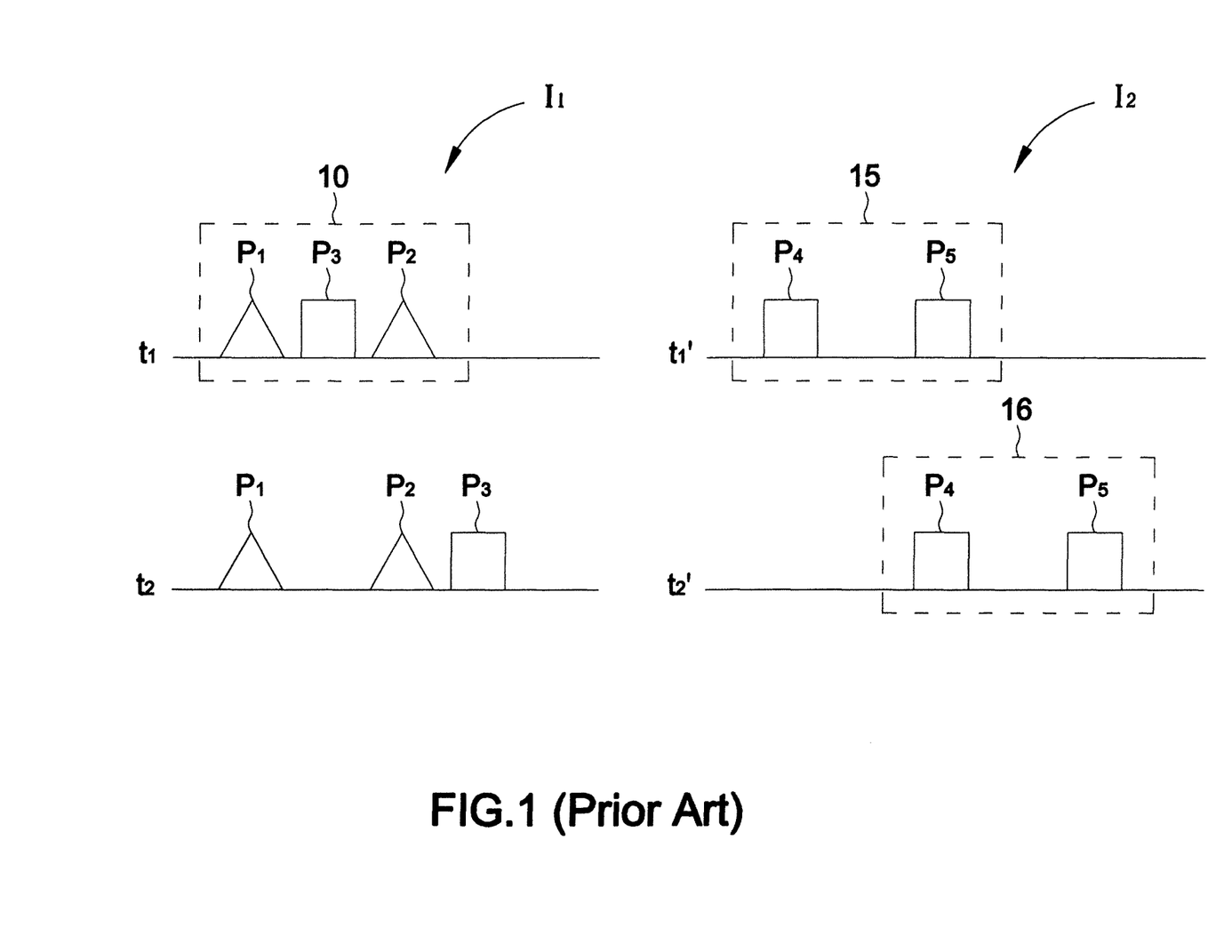
FIG. 1 is a diagram of an example using a large block size for performing block matching on different image data.
Figure 2:
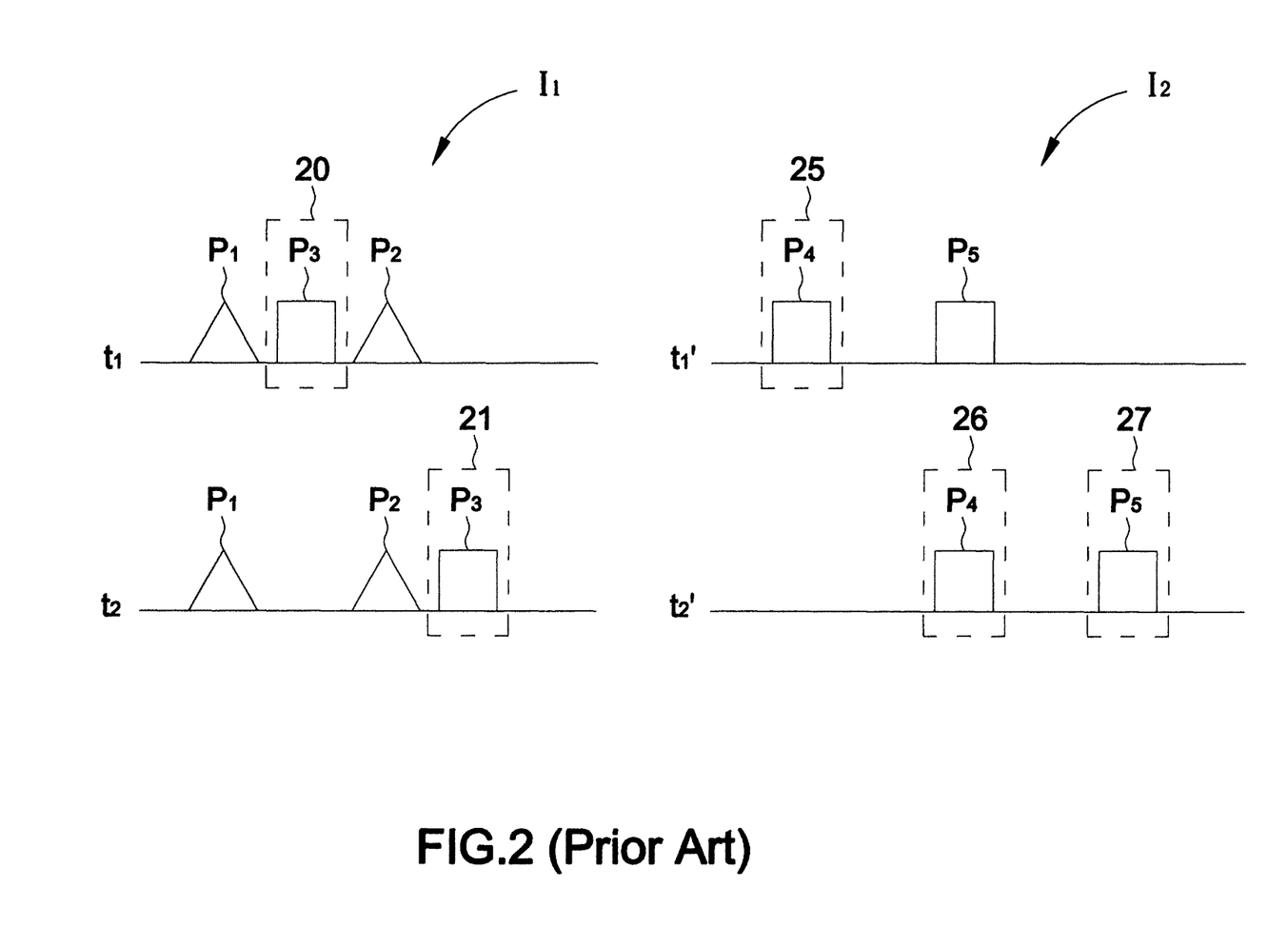
FIG. 2 is a diagram of an example using a small block size for performing block matching on the different image data in FIG. 1.

To better understand the characteristics of the invention, circumstances of using different block sizes for block matching shall be discussed. Reference is made first to FIG. 1 and FIG. 2, which show examples of block matching using different block sizes. FIG. 1 shows a diagram of an example using a large block size, e.g. 64×16 pixels, for performing block matching on image data $I_1$ and $I_2$. In the left half of FIG. 1, triangles $P_1$ and $P_2$ are still background images of the image data $I_1$ from a time point $t_1$ to a time point $t_2$, and a rectangle $P_3$ is a moving image object. Observed from FIG. 1, when using a size as large as an image block 10, it is practically difficult to find an image block similar to the image block 10; the reason is that the image block 10 has a larger coverage that includes both moving and still images. On the other hand, in the right half of FIG. 1, since rectangles $P_4$ and $P_5$ are moving objects and an image block 15 does not cover moving and still images, the foregoing issue does not result although a large-sized image block is also for block matching. For example, in an image at a time point $t_2'$, an image block 16 similar to the image block 15 in an image at a time point $t_1'$ is found.

Reference is now made to FIG. 2, showing a diagram of an example using a small block size, e.g. 16×8 pixels, for block matching. In FIG. 2, a small block size is used for performing block matching on the image data $I_1$ and $I_2$ shown in FIG. 1. Note that in FIG. 2, a small size block, rather than the large block size shown in FIG. 1, is used to perform block matching for processing the image data $I_1$; for example, the coverage of an image block 20 is used as a block size for block matching. In the left half of FIG. 2, at the time point $t_2$, an image block 21 similar to the image block 20 is found. However, when using a same block size for performing block matching on the image data $I_2$, as shown in the right half of FIG. 2, and considering that images represented by patterns $P_4$ and $P_5$ are quite similar, two image blocks 26 and 27 similar to the image block 25 at the time point $t_1'$ are found at the time point $t_2'$. Thus, a misjudgment of the rectangle $P_4$ in the image block 25 at the time point $t_1'$ having moved to the image block 27 at the time point $t_2'$ is likely to be made, when in fact the rectangle $P_4$ at the time point $t_2'$ is located in the image block 26.

Figure 3:
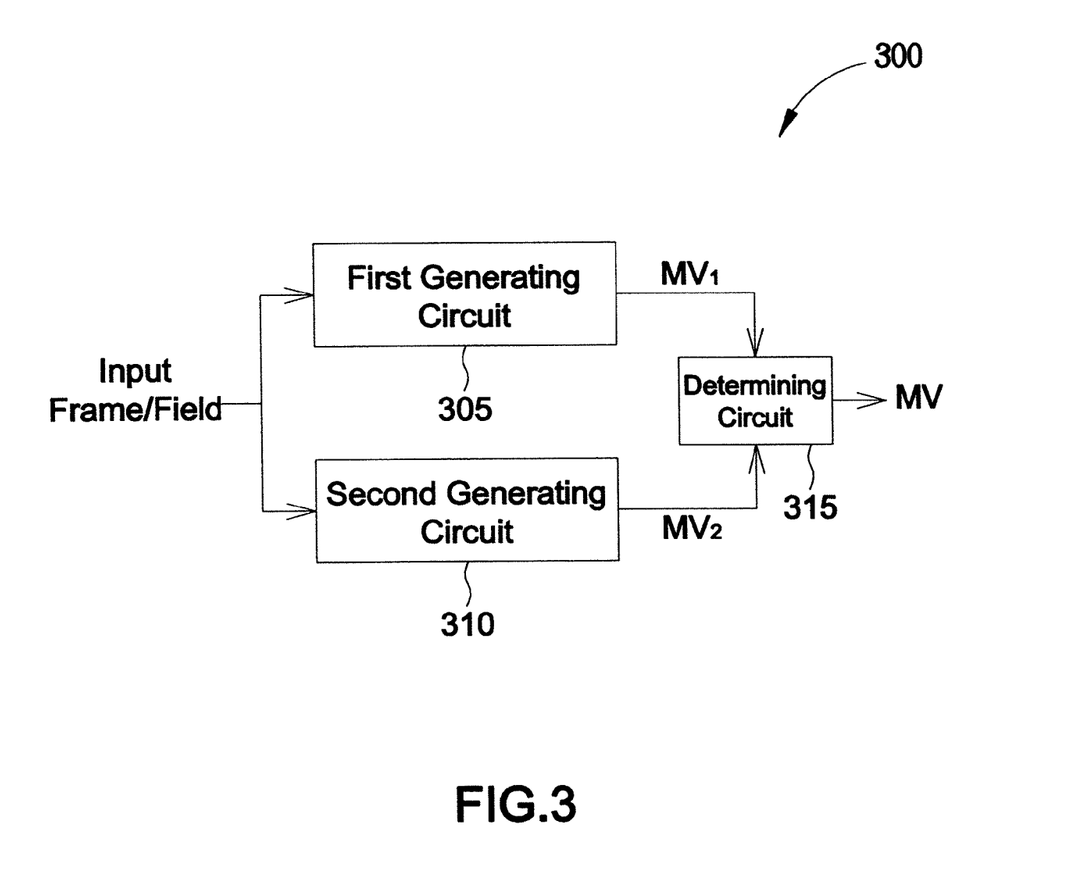
FIG. 3 is a block diagram of an apparatus for determining a motion vector according to one embodiment of the invention.
Figure 4:
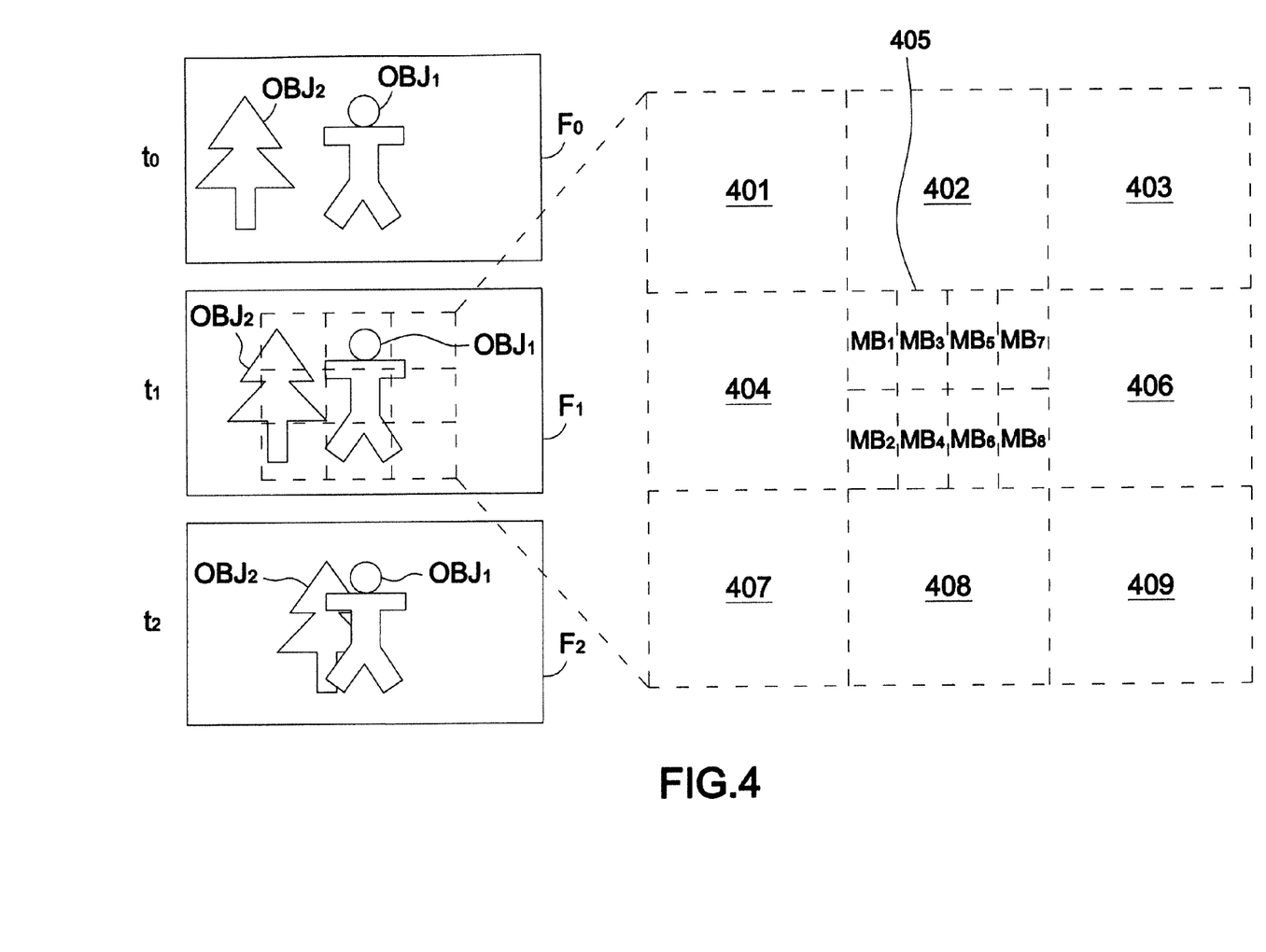
FIG. 4 is a diagram used to describe a method of processing a video frame in accordance with an embodiment of the invention.

To achieve a better video quality, according to the invention, different candidate motion vectors are generated by alternatively using large and small block sizes for block matching, and one of the candidate motion vectors is determined as a target motion vector of a block to be interpolated according to different image situations. FIG. 3 shows a block diagram of an apparatus 300 for determining a motion vector according to one embodiment of the invention. In this embodiment, the apparatus 300 is implemented for interpolating an interpolated frame between successive first and second frames. The first frame is partitioned into a plurality of first image blocks in a first block size, and a plurality of second image blocks in a second block size. The second frame is partitioned into a plurality of third image blocks in the first block size, and a plurality of fourth image blocks in the second block size. The interpolated frame is partitioned into a plurality of interpolated blocks. The apparatus 300 comprises a first generating circuit 305, a second generating circuit 310 and a determining circuit 315. The first generating circuit 305 performs a block matching operation on the first image blocks and the third image blocks according to the first block size to generate a first candidate motion vector $MV_1$ of an interpolated block to be interpolated. The second generating circuit 310 performs another block matching operation on the second image blocks and the fourth image blocks according to a second block size to generate a second candidate motion vector $MV_2$ of the interpolated block to be interpolated. The determining circuit 315 determines a target motion vector MV of the interpolated block to be interpolated according to either of the first candidate motion vector $MV_1$ and the second candidate motion vector $MV_2$. In this embodiment, the second block size equals the size of the interpolated block to be interpolated and is smaller than the first block size; that is, the first block size is a large block size and the second block size is a small block size. Further, in this embodiment, the first block size is an integer multiple of the second block size. In the following description illustrating operations of the apparatus 300, the apparatus 300 is capable of processing video frames containing tracked objects from e.g., a panning camera. The apparatus 300 may also be used for processing other video frames containing moving objects. FIG. 4 shows a diagram used to describe a method of processing a video frame containing tracked objects with a panning camera. Two frames $F_1$ and $F_2$ are video frames of original data at time points to and $t_2$, and a frame $F_1$ is a video frame to be ideally interpolated by the apparatus 300. Since the panning camera tracks a moving object $OBJ_1$, it is observed that the moving object $OBJ_1$ is located at an almost same position in the successive frames $F_0$ and $F_2$. Hence, it is expected that the moving object $OBJ_1$ is located at the same position in the frame $F_1$. In contrast, it is expected that a still object $OBJ_2$ in the background is located at a corresponding position in the frame $F_1$ for being located at different positions in the frames $F_0$ and $F_2$.

Figure 5A:
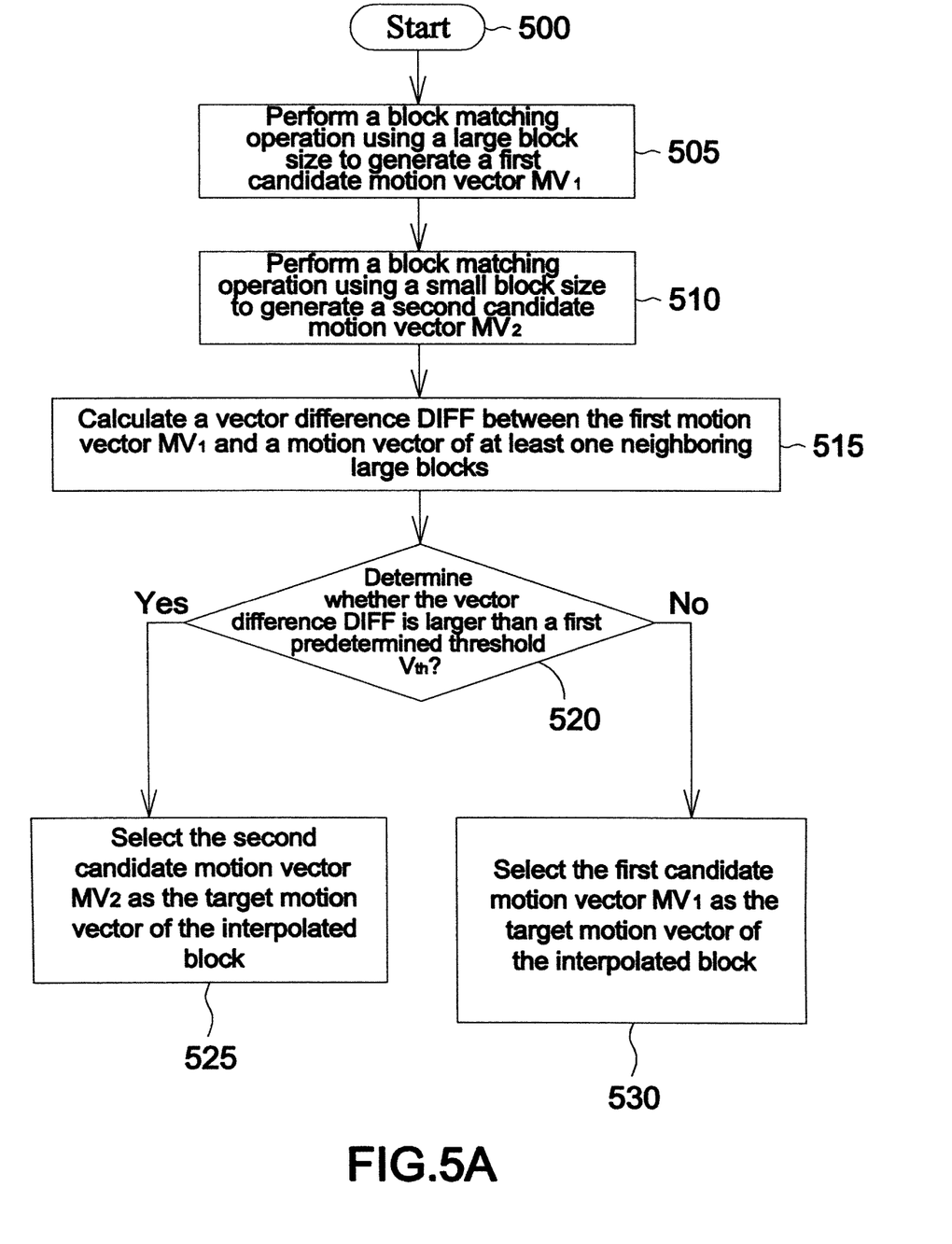
FIG. 5A is a flow chart of a first example process for determining a motion vector.

In practice, to generate the interpolated frame $F_1$ in this embodiment, a target motion vector of each interpolated block to be interpolated need be first determined. FIG. 5A shows a flow chart of a first example for determining a motion vector. For determining a motion vector of an interpolated block $MB_1$ to be interpolated for example, in Step 505, the first generating circuit 305 performs a block matching operation using a large block 405 having eight small blocks, each of which having a block size of $MB_1$, to generate the first candidate motion vector $MV_1$. In Step 510, the second generating circuit 310 performs another block operation matching using the small block size $MB_1$ to generate the second candidate motion vector $MV_2$. In Step 515, upon receiving the motion vectors $MV_1$ and $MV_2$, the determining circuit 315 first calculates a vector difference DIFF between the first motion vector $MV_1$ and a motion vector of at least one neighboring large block among the blocks 401 to 404, and 406 to 409. In Step 520, the determining circuit 315 then determines whether the vector difference DIFF is larger than a first predetermined threshold $V_{th}$. Taking the foregoing example for instance, the vector difference DIFF value is larger than the first predetermined threshold $V_{th}$. Therefore, the determining circuit 315 determines that between a motion direction of an image corresponding to the large block 405 and a motion direction of an image of the at least one neighboring large block is a quite large difference; that is, the large block 405 has a motion vector boundary. In Step 525, the determining circuit 315 accordingly selects the second candidate motion vector $MV_2$ generated from using the small block size $MB_1$ but not the first candidate motion vector $MV_1$ generated from using the large block size, as the target motion vector of the image block $MB_1$ to be interpolated. On the contrary, in another situation, supposing all the vector difference DIFF values corresponding to all neighboring blocks are smaller than the first predetermined threshold $V_{th}$, the determining circuit 315 then determines that the motion direction of the image corresponding to the large block 405 is approximately the same as the motion direction of any neighboring large block. Accordingly, in Step 530, the determining circuit 315 selects the first candidate motion vector $MV_1$ generated from using the large block size as the target motion vector of an image block, contained in the large block, to be interpolated. Alternatively, all motion vectors of the neighboring large blocks are added either with or without weighting, with the sum compared with another predetermined threshold. When the sum is larger than the threshold, the motion vector generated from using the small block size is adopted; when the sum is smaller than the threshold, the motion vector generated from using the large block size is adopted. A frequent circumstance of the foregoing motion difference value being smaller than the first predetermined threshold $V_{th}$ is when the large block and the neighboring large blocks all correspond to the background; that is, the large block is not confronted with a motion vector boundary. Thus, the apparatus 300 effectively reduces the issue that similar images blocks are not easily found when performing block matching only using a large block size on images having a motion vector boundary. Note that the example shown in FIG. 4 is illustrative on operations of the determining circuit 315 but is not meant to be limiting on the scope of the invention.

Figure 5B:
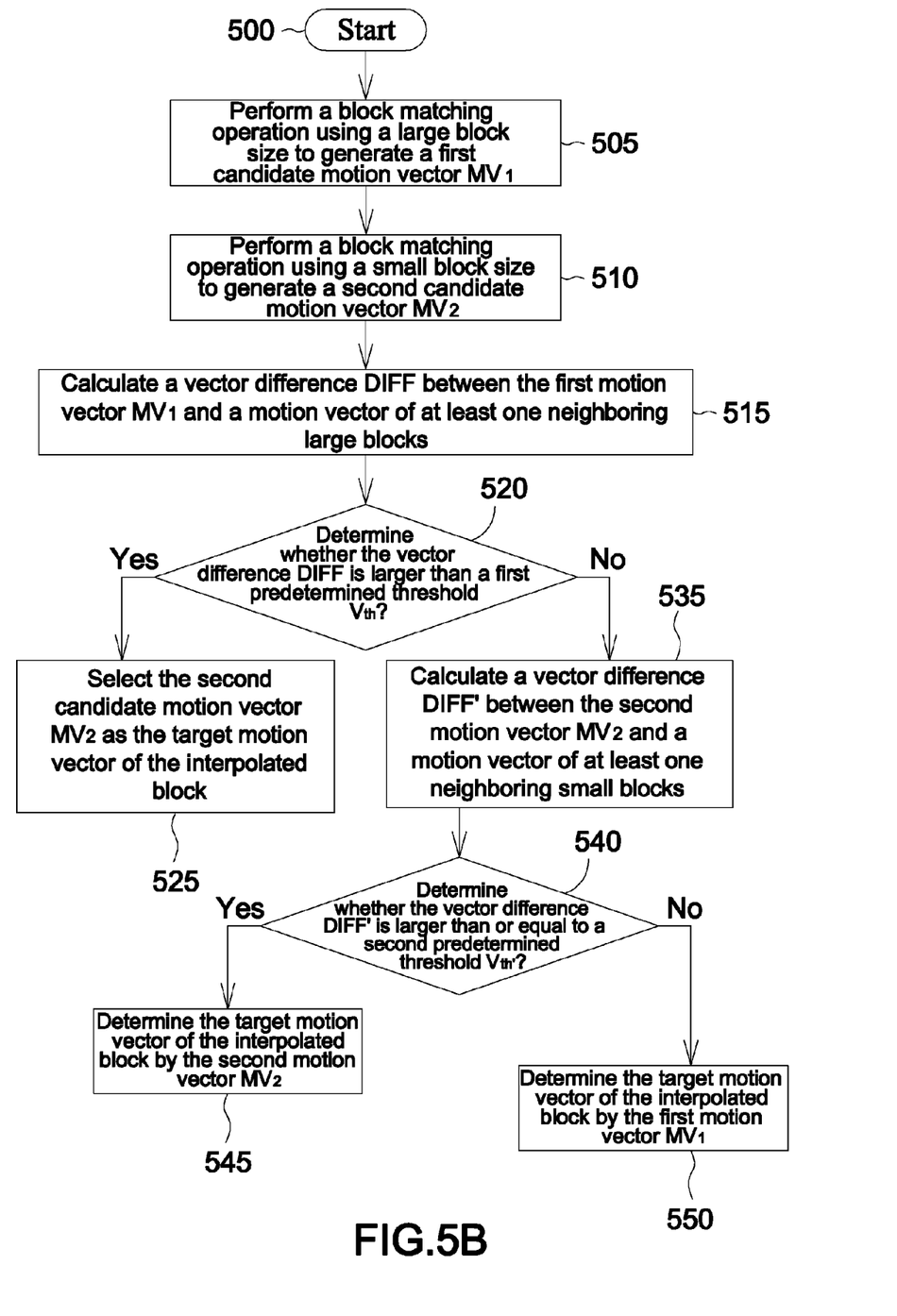
FIG. 5B is a flow chart of a second example process for determining a motion vector.

Determining a target motion vector when using a large block without a motion vector boundary shall be discussed. When the vector difference DIFF values between the motion vector of the large block and the motion vector of the neighboring large blocks are smaller than the first predetermined threshold $V_{th}$, the motion vector of the large block is not used as the target motion vector of the block, contained in a small block in the large block, to be interpolated; instead, steps to be described below are performed. Reference is now made to FIG. 5B showing a flow chart of a second example determining a motion vector. In FIG. 5B, steps 500 to 525 are similar to the corresponding steps in FIG. 5A. In a large block, a motion block calculated using a small block is compared with motion vectors calculated using neighboring small blocks. In Step 535, a vector difference DIFF' value between the second candidate motion vector $MV_2$ according a block size to be interpolated, that is, the small block size, and a motion vector of a neighboring small image block, is calculated. In Step 540, it is determined whether the vector difference DIFF' value is larger than or equal to a second predetermined threshold $V_{th}'$. When the vector difference DIFF' value between the second motion vector $MV_2$ and a motion vector of at least one neighboring image block partitioned according to a second block size is larger than or equal to the second threshold $V_{th}'$, the determining circuit 315 determines that between the motion direction of an image corresponding to an image block to be interpolated and the motion direction of an image corresponding to the at least one neighboring image block is quite a difference. At this point, the determining circuit 315 determines the target motion vector of the image block to be interpolated by referencing the second motion vector $MV_2$, as in Step 545. On the contrary, when the vector difference DIFF' value is smaller than the second predetermined threshold $V_{th}'$, the determining circuit 315 determines that the motion direction of the image corresponding to the image block to be interpolated is approximately the same as the motion direction of the image corresponding to any of the neighboring image blocks. The determining circuit 315 then determines the target motion vector by referencing a candidate motion vector according to the large block, as in Step 550.

Figure 5C:
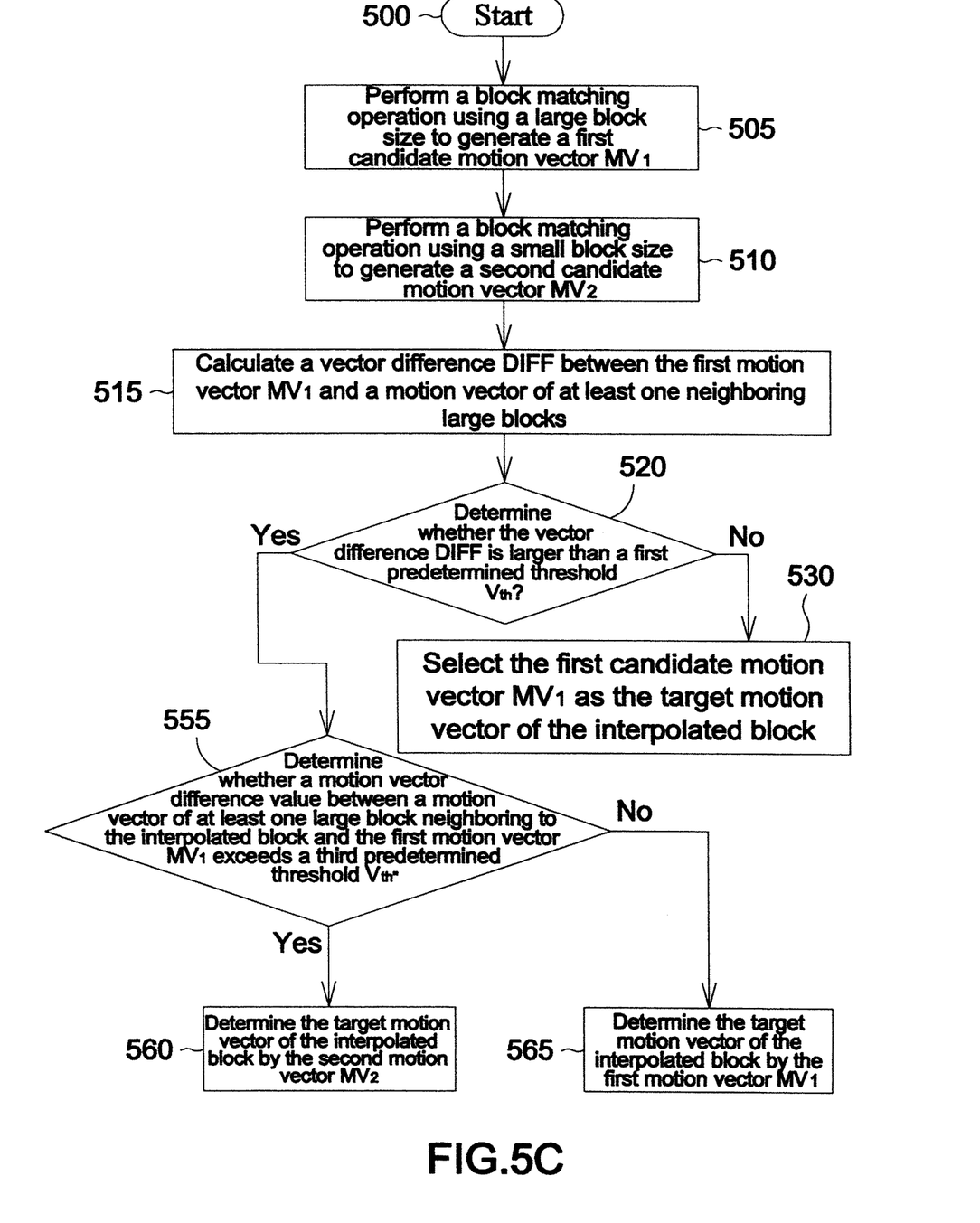
FIG. 5C is a flow chart of a third example process for determining a motion vector.

In another embodiment, in order to optimize an interpolated video quality, the foregoing flow may be modified; for example, motion vectors of eight image blocks to be interpolated in a small block size contained in the large block 405 are determined using different image blocks. FIG. 5C shows a flow chart of a third example determining a motion vector. In FIG. 5C, Steps 500 to 520, and Step 530, are similar to the corresponding steps in FIG. 5A. In Step 555, it is determined whether the large block is neighboring to the interpolated block to be interpolated, and whether a motion vector difference value between a motion vector of at least one large block neighboring to the interpolated block and the first motion vector $MV_1$ exceeds a third predetermined threshold $V_{th}''$. In Step 560, when the difference value between the motion vector of at the least one large block, neighboring to the image block to be interpolated and having the first block size, and the motion vector of the large block 405 exceeds the third predetermined threshold $V_{th}''$, the determining circuit 315 determines the target motion vector by referencing the second candidate motion vector $MV_2$; else, the determining circuit 315 determines the target motion vector by referencing the first candidate motion vector $MV_1$, as in Step 565. More specifically, the differences between the motion vectors and the large block 405, and the neighboring large blocks 401 to 404, and 406 to 409, are determined, followed by determining the target motion vectors of the neighboring small blocks $MB_1$ to $MB_8$ according to the foregoing difference between the motion vectors. For example, the difference values between the motion vector of the image corresponding to the large block 405 and the motion vectors of the images of the neighboring large blocks 401, 404 and 407 are larger than the third predetermined threshold $V_{th}''$, and the difference values between the motion vector of the image corresponding to the large block 405 and the motion vectors of the images of the neighboring large blocks 402, 403, 405, 406, 408 and 409 are smaller than or equal to the third predetermined threshold $V_{th}''$. Since the large blocks 401, 404 and 407 are neighboring to the small blocks $MB_1$ and $MB_2$, the determining circuit 315 adopts the candidate motion vectors generated from block matching using the small block size as the target motion vectors of the image blocks $MB_1$ and $MB_2$. For the image blocks $MB_3$ to $MB_8$, the determining circuit 315 adopts the motion vectors from block matching using the large block size as the target motion vectors of the image blocks $MB_3$ to $MB_8$. Another example shall be given below. Suppose the difference value between the motion vector of the image corresponding to the large block 405 and the motion vector of the image of the neighboring large block 402 is large, while the difference values between the motion vector of the image corresponding to the large block 405 and the motion vectors of the neighboring images 401, 403, 404, 406, 407, 408 and 409 are small. Since the large block 402 is neighboring to the small blocks $MB_1$, $MB_3$, $MB_5$ and $MB_7$, the determining circuit 315 adopts the candidate motion vectors generated from block matching using the small block size as the target motion vectors of the image blocks $MB_1$, $MB_3$, $MB_5$ and $MB_7$. For the image blocks $MB_2$, $MB_4$, $MB_6$ and $MB_8$, the determining circuit 315 adopts the candidate motion vectors generated from block matching using the large block size as the target motion vectors of the image blocks $MB_2$, $MB_4$, $MB_6$ and $MB_8$. Note that the two examples above are not meant to be construed as limiting the invention. Without departing from the spirit of the invention, other modifications such as setting different thresholds with respect to the different neighboring large blocks or designating different weights on the different neighboring large blocks can be made.

Figure 5D:
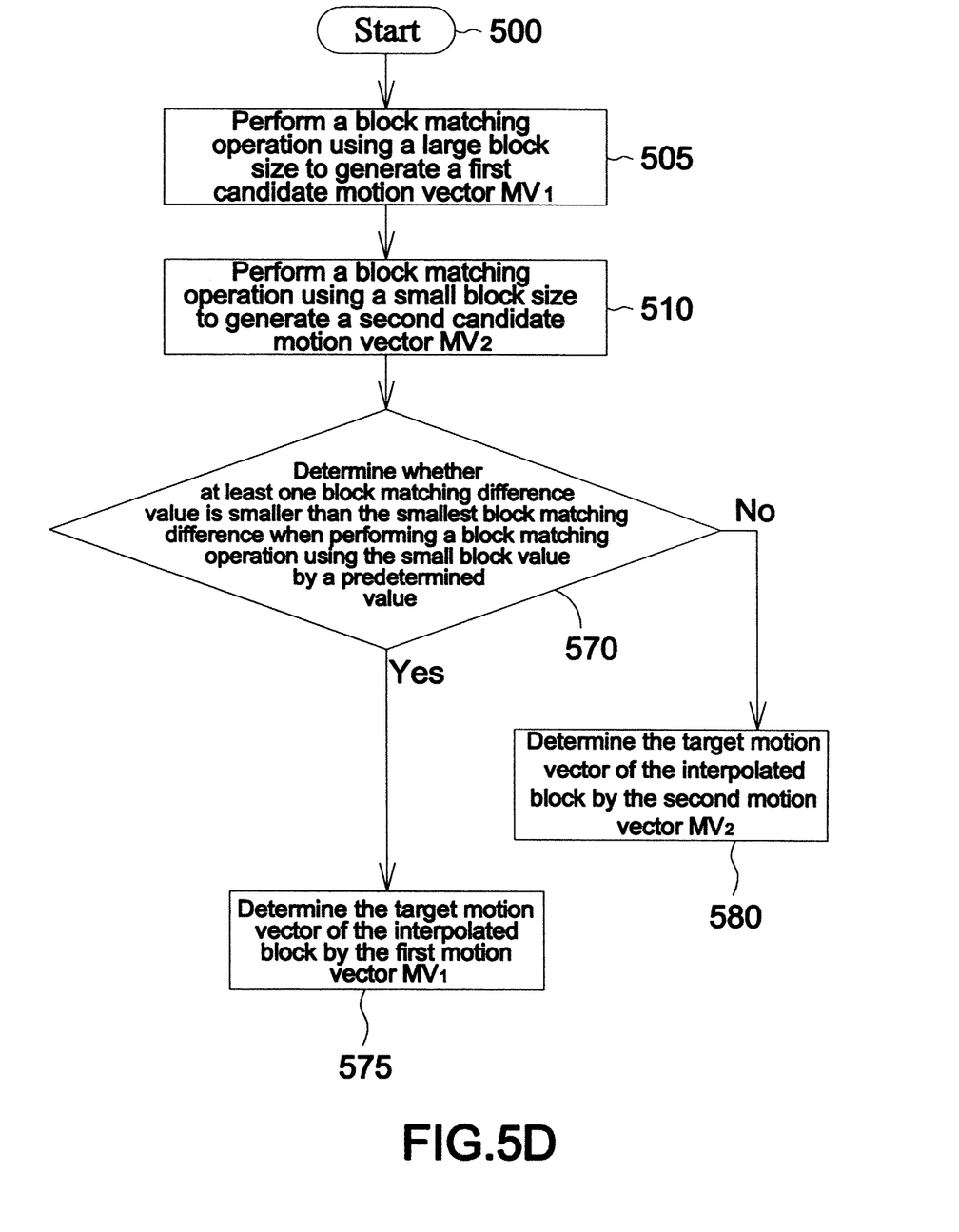
FIG. 5D is a flow chart of a fourth example process for determining a motion vector.

In another embodiment of the invention, apart from determining which candidate motion vector is to be used as a target motion vector according to the motion vector boundary, matching results from block matching using the small block may also be used to determine which candidate vector is to be used as the target block matching. Reference is made to FIG. 5D showing a flow chart of a fourth example determining a motion vector. In FIG. 5D, Steps 500 to 510 are similar to the corresponding steps in FIG. 5A. In principle, for example, when the second generating circuit 310 finds that at least one block matching difference value is smaller than the smallest matching difference by a predetermined value, while determining the motion vector of the small block MB$_1$ to perform block matching, it means that several blocks similar to the small block MB$_1$ are found, and that an accurate motion vector cannot be determined. The second generating circuit 310 then usually regards the motion vector corresponding to the smallest block matching difference value as the motion vector of the small block MB$_1$, which is the candidate motion vector generated by the small block. However, it is likely that a target motion vector may not be entirely accurate when the determining circuit 315 determines the target motion vector by solely referencing the candidate motion vector generated by the small block. Hence, the determining circuit 315 determines the target motion vector by referencing the candidate motion vector generated by the large block. On the contrary, the determining circuit 315 references the candidate motion vector generated by the small block to determine the target motion vector. Therefore, in Step 570, when performing block matching using the small block, it is determined whether at least one block matching difference value is smaller than the smallest block matching difference value by a predetermined value. When the result from Step 570 is affirmative, the target motion vector is determined by referencing the first candidate motion vector MV$_1$ generated from block matching using the large block, as in Step 575. When the result from Step 570 is negative, the target motion vector is determined by referencing the second candidate motion vector MV$_2$ generated from block matching using the small block, as in Step 580.

Figure 5E:
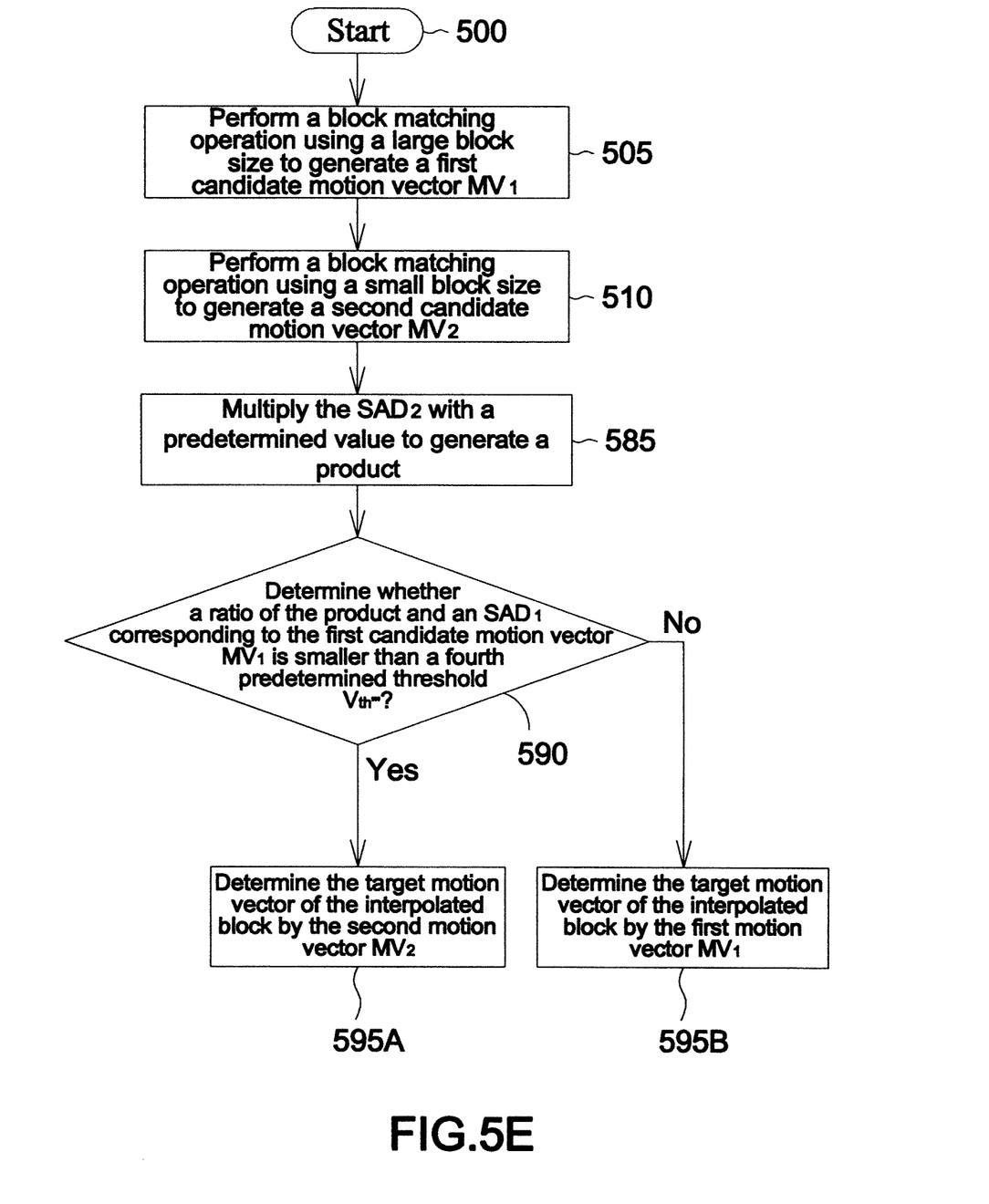
FIG. 5E is a flow chart of a fifth example determining a motion vector.

In other embodiments, a block matching difference value, e.g., a sum of absolute pixel differences (SAD), may also be used to determine whether to select a candidate motion vector as a target motion vector. With reference to FIG. 4 and FIG. 5E, FIG. 5E shows a flow chart of a fifth example for determining a motion vector. Steps 500 to 510 are similar to the corresponding steps in FIG. 5A. Taking the image block MB$_1$ for example, when the second generating circuit 310 generates the second candidate motion vector MV$_2$, the second candidate motion vector MV$_2$ and a corresponding SAD$_2$ are forwarded to the determining circuit 315. In Step 585, the determining circuit 315 multiplies the SAD$_2$ with a predetermined value, e.g., 8, to generate a product. In Step 590, it is determined whether a ratio of the product and an SAD$_1$ corresponding to the first candidate motion vector MV$_1$ generated by the first generating circuit 305 is smaller than a fourth predetermined threshold V$_{th}$'''. When the ratio of the product and the SAD$_1$ corresponding to the first candidate motion vector MV$_1$ generated by the first generating circuit 305 is smaller than the fourth predetermined threshold V$_{th}$''', the determining circuit 315 determines the target motion vector of the image block MB$_1$ by referencing the second candidate motion vector MV$_2$, as in Step 595A. On the other hand, when the ratio of the product and the SAD$_1$ is greater than or equal to the fourth predetermined threshold V$_{th}$''', the determining circuit 315 determines the target motion vector of the image block MB$_1$ by referencing the first candidate motion vector MV$_1$, as in Step 595B. More specifically, the determining circuit 315 may selectively adopt either the first candidate motion vector MV$_1$ or the second candidate motion vector MV$_2$ as the target motion vector of the image block MB$_1$ according to the product and the block matching difference value corresponding to the first candidate motion vector MV$_1$.

In all the foregoing embodiments, the determining circuit 315 may further calculate the candidate motion vector to be adopted to generate a target motion vector; the first and second generating circuits 205 and 310 may be integrated into a single motion vector generating circuit having operation capabilities and functions of the first and second generating circuits 305 and 310. In addition, all the foregoing methods for determining the target motion vector can be integrated into another preferred embodiment—such modifications are included in the scope of the invention.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for determining a motion vector of one interpolated image block in an interpolated image frame in a sequenced order of image frames, wherein the interpolated image frame is generated according to a first image frame and a second image frame, in succession, and the first and second image frames are partitioned into a plurality of first image blocks of a first image block size and a plurality of second image blocks of a second image block size, wherein the first image block size is larger than the second image block size, the method comprising:
  performing block matching for a first image block between the first image frame and the second image frame to generate a first candidate motion vector locating the interpolated image block in the interpolated image frame, the first image block being of the first block size;
  performing block matching for a second image block between the first image frame and the second image frame to generate a second candidate motion vector locating the interpolated block in the interpolated image frame, the second image block being of the second image block size; and
  selecting one of the first candidate motion vector and the second candidate motion vector as a target motion vector locating the interpolated image block in the interpolated image frame, wherein selecting the target motion vector of the interpolated image block comprises:
    determining whether a difference between the first candidate motion vector and a motion vector of a neighbor block of the first block size exceeds a predetermined threshold;
    selecting the second candidate motion vector as the target motion vector of the interpolated block upon the determination that the difference between the first candidate motion vector and a motion vector of a neighbor block exceeds the predetermined threshold; and
    selecting the first candidate motion vector as the target motion vector of the interpolated image block upon the positive determination that the difference between the first candidate motion vector and a motion vector of a neighbor block does not exceed the predetermined threshold.

2. The method as claimed in claim 1, wherein the first image block size is an integer multiple of the second image block size, and the size of the interpolated image block is the second image block size.

3. The method as claimed in claim 1, wherein the step of determining the target motion vector of the interpolated block comprises steps of:
  multiplying a block matching difference value corresponding to the second candidate motion vector with a predetermined value to generate a product; and selecting either of the first motion vector and second motion vector according to the product and a block matching difference value corresponding to the first candidate motion vector to generate the target motion vector.

4. The method as claimed in claim 3, wherein the step of selecting either of the first motion vector and second motion vector comprises a step of:

when a ratio of the product and the block matching difference value corresponding to the first candidate motion vector is smaller than a predetermined threshold, determining the target motion vector by the second candidate motion vector;

else, determining the target motion vector by the first candidate motion vector.

5. The method as claimed in claim 1, wherein the step of determining the target motion vector of the interpolated block comprises a step of:

when a difference between the second candidate vector and a motion vector of a neighbor block, which is the second block size and, exceeds a predetermined threshold, determining the target motion vector of the interpolated block by the second candidate motion vector; else, determining the target motion vector of the interpolated block by the first candidate motion vector.

6. The method as claimed in claim 5, wherein the neighbor block and the interpolated block are located in a same block partitioned according to the first block size.

7. An apparatus for determining a motion vector of one interpolated block in an interpolated frame, wherein the interpolated frame is generated according to a first frame and a second frame, in succession, and the interpolated frame is partitioned into a plurality of first blocks in a first block size and a plurality of second blocks in a second block size, wherein the first image block size is larger than the second image block size, the apparatus comprising:

a first generating circuit, for performing block matching for a first image block between the first image frame and the second image frame to generate a first candidate motion vector locating the interpolated image block in the interpolated image frame, the first image block being of the first block size;

a second generating circuit, for performing block matching for a second image block between the first image frame and the second image frame to generate a second candidate motion vector locating the interpolated block in the interpolated image frame, the second image block being of the second image block size; and a determining circuit, coupled to the first generating circuit and the second generating circuit, for selecting one of the first candidate motion vector and the second candidate motion vector as a target motion vector locating the interpolated image block in the interpolated image frame, wherein selecting the target motion vector of the interpolated image block comprises:

determining whether a difference between the first candidate motion vector and a motion vector of a neighbor block of the first block size exceeds a predetermined threshold;

selecting the second candidate motion vector as the target motion vector of the interpolated block upon the determination that the difference between the first candidate motion vector and a motion vector of a neighbor block exceeds the predetermined threshold; and selecting the first candidate motion vector as the target motion vector of the interpolated image block upon the positive determination that the difference between the first candidate motion vector and a motion vector of a neighbor block does not exceed the predetermined threshold.

8. The method as claimed in claim 1, wherein performing block matching for the first image block comprises identifying blocks having a smallest sum of absolute difference (SAD).

9. The method as claimed in claim 1, wherein performing block matching for the second image block comprises identifying blocks having a smallest sum of absolute difference (SAD).

* * * * *